(12) United States Patent
Finkler et al.

(10) Patent No.: US 12,316,506 B2
(45) Date of Patent: *May 27, 2025

(54) NETWORK MANAGEMENT USING HIERARCHICAL AND MULTI-SCENARIO GRAPHS

(71) Applicant: Utopus Insights, Inc., Valhalla, NY (US)

(72) Inventors: Ulrich A. Finkler, Mahopac, NY (US); Fook-Luen Heng, Yorktown Heights, NY (US); Steven N. Hirsch, Burlington, VT (US); Mark A. Lavin, Katonah, NY (US); Jun Mei Qu, Beijing (CN); Amith Singhee, Bangalore (IN); Wei Wu, Xi'an (CN)

(73) Assignee: Utopus Insights, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/531,188

(22) Filed: Dec. 6, 2023

(65) Prior Publication Data

US 2024/0267297 A1 Aug. 8, 2024

Related U.S. Application Data

(63) Continuation of application No. 17/804,847, filed on May 31, 2022, now Pat. No. 11,888,698, which is a continuation of application No. 16/801,145, filed on Feb. 25, 2020, now Pat. No. 11,349,720, which is a continuation of application No. 15/884,290, filed on Jan. 30, 2018, now Pat. No. 10,574,533, which is a continuation of application No. 14/950,219, filed on Nov. 24, 2015, now Pat. No. 9,882,782, which is a
(Continued)

(51) Int. Cl.
*H04L 41/12* (2022.01)
*H04L 41/14* (2022.01)
*H04L 41/22* (2022.01)

(52) U.S. Cl.
CPC ............ *H04L 41/12* (2013.01); *H04L 41/145* (2013.01); *H04L 41/22* (2013.01)

(58) Field of Classification Search
CPC ........ H04L 41/12; H04L 41/145; H04L 41/22
See application file for complete search history.

(56) References Cited

U.S. PATENT DOCUMENTS

| 9,882,782 | B2 * | 1/2018 | Finkler | ................ H04L 41/145 |
| 9,893,948 | B2 * | 2/2018 | Finkler | .................. H04L 41/12 |
| 10,574,533 | B2 * | 2/2020 | Finkler | .................. H04L 41/22 |

(Continued)

*Primary Examiner* — Steven Hieu D Nguyen
(74) *Attorney, Agent, or Firm* — Ahmann Kloke LLP

(57) ABSTRACT

A method, system, and computer program product to manage a network comprising a plurality of interconnected components are described. The method includes obtaining a set of all the components that are part of the network over time, and identifying one or more repeating patterns of components among the set of all the components as corresponding lower-level definitions to generate a hierarchical set of all the components. The method also includes obtaining time-varying information regarding topology and operational values within the network, and creating a representation of the network at a set of times based on the hierarchical set of all the components and the time-varying information.

19 Claims, 6 Drawing Sheets

Related U.S. Application Data continuation of application No. 14/856,652, filed on Sep. 17, 2015, now Pat. No. 9,893,948.

(60) Provisional application No. 62/138,547, filed on Mar. 26, 2015.

(56) References Cited

U.S. PATENT DOCUMENTS

| | | | |
|---|---|---|---|
| 11,349,720 B2* | 5/2022 | Finkler | H04L 41/145 |
| 11,888,698 B2* | 1/2024 | Finkler | H04L 41/12 |
| 2004/0186903 A1 | 9/2004 | Lambertz | |
| 2007/0268294 A1 | 11/2007 | Eagen et al. | |
| 2011/0289207 A1* | 11/2011 | Liu | H04L 41/12 |
| | | | 709/224 |
| 2012/0036484 A1* | 2/2012 | Zhang | H04L 41/12 |
| | | | 715/853 |
| 2014/0201359 A1* | 7/2014 | Uppalli | H04L 45/02 |
| | | | 709/224 |

* cited by examiner

NETWORK MANAGEMENT USING HIERARCHICAL AND MULTI-SCENARIO GRAPHS

CROSS-REFERENCE TO RELATED APPLICATIONS

The present application is a continuation of, and seeks the benefit of U.S. patent application Ser. No. 17/804,847, filed May 31, 2022, entitled "Network Management using Hierarchical and Multi-Scenario Graphs," which is a continuation of, and seeks the benefit of U.S. patent application Ser. No. 16/801,145, filed Feb. 25, 2020, entitled "Network Management using Hierarchical and Multi-Scenario Graphs," now U.S. Pat. No. 11,349,720, which is a continuation of, and seeks the benefit of U.S. patent application Ser. No. 15/884,290, filed Jan. 30, 2018, entitled "Network Management using Hierarchical and Multi-Scenario Graphs," now U.S. Pat. No. 10,574,533, which is a continuation of, and seeks the benefit of U.S. patent application Ser. No. 14/950,219, filed Nov. 24, 2015, entitled "Network Management Using Hierarchical and Multi-Scenario Graphs," now U.S. Pat. No. 9,882,782, which is a continuation of, and seeks the benefit of U.S. patent application Ser. No. 14/856,652, filed Sep. 17, 2015, entitled "Network Management Using Hierarchical and Multi-Scenario Graphs," now U.S. Pat. No. 9,893,948, which claims priority to U.S. Provisional Patent Application No. 62/138,547, filed Mar. 26, 2015, entitled "Network Management Using Hierarchical and Multi-Scenario Graphs," all of which are hereby incorporated by reference herein.

BACKGROUND

The present invention relates to management of time-varying networks, and more specifically, to network management using hierarchical and multi-scenario graphs.

Networks comprised of many interconnected components must be represented in computational form for purposes of data interchange, analysis, and simulation, for example. Exemplary networks include gas pipelines, electrical utility networks, electro-mechanical networks such as aircraft systems, transportation networks, and telecommunication networks. Most real-world networks include time-varying aspects such that parameter values or structural elements (or both) may be time-dependent. Representing such networks as a series of snapshots that convey the time dependency requires a large amount of memory. Yet, representing such networks incrementally (e.g., using a software revision control system) is computationally challenging.

SUMMARY

Embodiments include a method, system, and computer program product to manage a network comprising a plurality of interconnected components. The method includes obtaining a set of all the components that are part of the network over time, and identifying one or more repeating patterns of components among the set of all the components as corresponding lower-level definitions to generate a hierarchical set of all the components. The method also includes obtaining time-varying information regarding topology and operational values within the network, and creating a representation of the network at a set of times based on the hierarchical set of all the components and the time-varying information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, many types of networks include a number of interconnected components or nodes. For a number of network management purposes, a computational representation of the network is required at a given time or over a range of times. The representation may be based on historical information about a real network for maintenance or diagnosis purposes, for example. The representation may instead be a test scenario (possibly among multiple scenarios) that is used to determine a future configuration for the network to achieve a particular result. Currently, the representation requires storing multiple representations of the complete network (one at each time interval of interest). This is because, within a time range of interest, components may be added or removed, connectivity among components may be changed, or other changes may be made to the network. For example, when the network is a power grid, the grid connectivity may change regularly due to new customers being added, existing customers being removed, or an outage. Embodiments of the systems and methods detailed herein facilitate efficient representation of a network at a given point in time (or range of times) for purposes of analysis, hypothesis testing, diagnosis, and other management. The embodiments include storing a superset of components, where the superset includes the set of all components of the network that exist at at least one point in the range of times of potential interest. The superset of components is used to identify repeating patterns that may be stored as references to obtain a hierarchical set of components that is used together with time-varying information. The time-varying information facilitates multi-scenario representations that incorporate topological changes (the addition or removal of a structural element) and operational changes (e.g., setting of a switch or valve) in a hierarchical graph without the need for storing multiple full representations.

Figure 1:
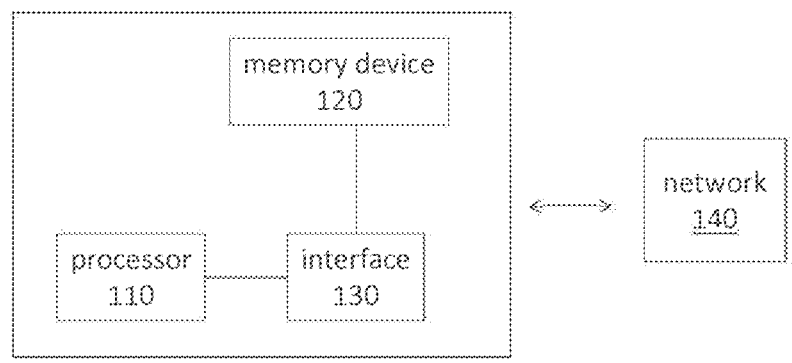
FIG. 1 is a block diagram of an exemplary system to perform network management according to embodiments.

FIG. 1 is a block diagram of an exemplary system 100 to perform network management according to embodiments discussed herein. The system 100 includes at least one or more processors 110, one or more memory devices 120, and an interface 130 to receive inputs and provide outputs. The memory device 120 may store instructions for the processor 110 to create one or more representations and answer a query or perform management tasks for the network 140. The memory device 120 may also store the superset of elements that form the building blocks for the hierarchical graph created by the processor 110. When the system 100 is involved in the analysis (e.g., diagnosis) of an existing network 140, the memory device 120 may store historical data that makes indicating the topological and operational states of the network 140. When the system 100 is involved in design (e.g., scenario testing) of a network 140, the memory device 120 may store topological and operational states provided as inputs. As noted above, the network 140 may be any collection of interconnected components. Exemplary networks 140 include gas pipelines, electrical utility networks, electro-mechanical networks such as aircraft systems, transportation networks, and telecommunication networks.

Figure 2:
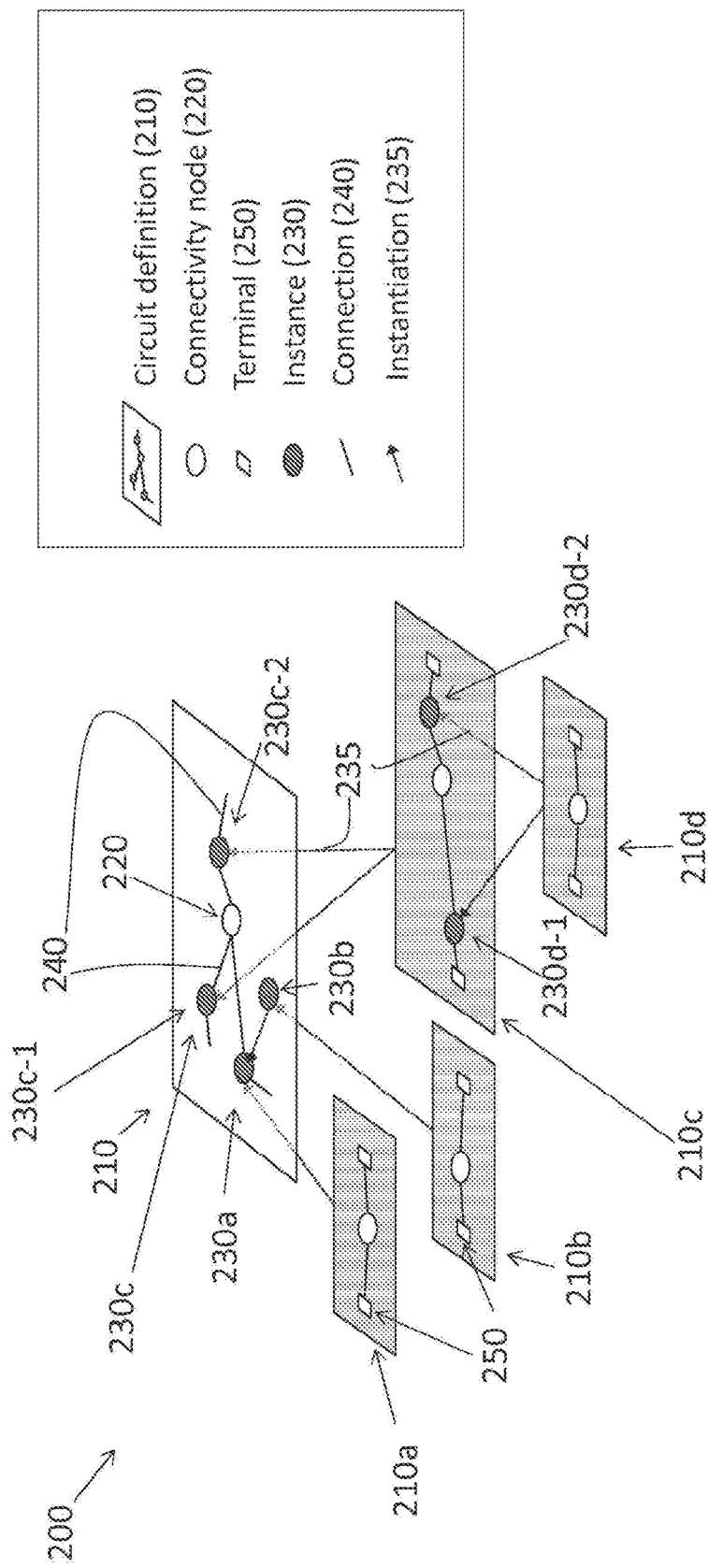
FIG. 2 illustrates hierarchical graphing according to an embodiment.

FIG. 2 illustrates hierarchical graphing according to an embodiment. FIG. 2 shows a hierarchical graph 200 beginning with a root circuit definition 210 at one time point. FIG. 2 and shows the use of reference definitions 210a to 210d to indicate repeating patterns of components. The circuit definition 210 shown in FIG. 2 is a hierarchical graph 200 of a portion of the network 140 used here for illustrative purposes. Although not intended to be limiting, a nomenclature is discussed for the hierarchy for explanatory purposes. The definition 210 or cell describes a type of component of the network 140. The component includes one or more entities that may have connections between them. Three types of entities are shown in FIG. 2: an instance 230, a terminal 250, and a connectivity node 220. An instance 230 is an occurrence of another definition 210 in a particular context. For example, the root definition 210 in FIG. 2 includes four instances 230a, 230b, 230c-1, 230c-2. Each of the instances 230a, 230b, 230c-1, 230c-2 corresponds with a (lower-level) definition 210a, 210b, 210c. As indicated in FIG. 2, both instances 230c-1 and 230c-2 correspond with the same pattern or definition 210c. Some of the terminals 250 of an instance 230 may be connected to other instances 230 or to other connectivity nodes 220. The terminal 250 models connection points on the definition 210 and facilitates connections from instances 230 of a definition 210 to other entities outside the definition 210 (other parts of the network 140). A connectivity node 220 models a connection point between other entities (instances 230 or terminals 250). As FIG. 2 shows, the hierarchical structure corresponding to a definition 210 gives rise to the concept of hierarchical entities or a sequence of entities with a root definition, where the first entity in the sequence is in the definition 210 shown in FIG. 2, for example, and subsequent entities in the sequence are part of the definitions 210a through 210d, discussed below.

The exemplary circuit definition 210 shown in FIG. 2 includes a connectivity node 220 and four instances 230 (230a through 230c-2). Each solid line indicates a connection 240. As FIG. 2 shows, three of the instances 230a, 230c-1, 230c-2 indicate additional connections 240 that could be made to those instances 230. Each instance 230 shown in the circuit definition 210 is associated with a reference definition 210. Each instantiation 235 of an instance 230 is indicated by the dashed arrows. Put differently, each occurrence of a given definition 210 is indicated by dashed arrows (235) to the associated instance 230 (except the root definition 210). This unpacking of an instance 230 to a definition 210 may be layered (this is the hierarchical entity noted above). That is, as shown in FIG. 2, one of the definitions 210c associated with two of the instances 230c-1, 230c-2 of the definition 210 includes instances 230d-1, 230d-2 itself. These instances 230d-1, 230d-2 are, in turn, associated with another definition 210d. The two instances 230d-1, 230d-2 are associated with the same definition 210d in the example, but the two instances 230d1-, 230d-2 (and the two instances 230c-1, 230c-2 shown as associated with the same definition 210c) may be different entities that are associated with different definitions 210. As shown in FIG. 2, the layers or hierarchies of patterns representing instances 230 of a circuit definition 210 facilitate efficient representation of the network 140, because the entire sequence of entities associated with an entity (e.g., instance 230) need not be represented in the definition 210. The hierarchical graph 200 is one part of the representation used, according to the embodiments herein, for analysis, diagnosis, and other management of the network 140. The time-varying aspect of structure (topological changes) and values (operational changes) must also be considered for the complete representation, as detailed below.

Time-varying information conveys the topological (existence and connection) and operational (conductivity and flow) status of each entity and connection 240 in the hierarchical graph of the network 140. Thus, the combination of the hierarchical graph and the time-varying information provides the complete representation of the network 140 with which management tasks may be undertaken. This time-varying information applies to several aspects of the network 140, as detailed herein. Again, while a particular nomenclature is used herein for explanatory purposes, the language is not intended to limit the scope of the embodiments. An existence state of each entity 220, 230, 250 is a discrete-valued time series that indicates whether the entity 220, 230, 250 exists at the corresponding time or not. The existence state may be unknown at a given time. A conductivity state is associated with each hierarchical entity and is a discrete-valued time series that indicates whether flow is possible through the hierarchical entity. The conductivity state, like the existence state, may be unknown at a given time point. An entity may have a container relationship with another entity. This relationship is a discrete-valued time series that indicates whether one entity is contained within another entity. A container relationship indicates containment between entities rather than a hierarchy. One entity may contain another entity at the same level of hierarchy. For example, a smart meter (one entity) may be contained in a house (another entity). Because a smart meter is not necessarily contained in every house, the definition 210 of a house may not include an instance of a smart meter. Instead, a container relationship is indicated for a house that does include a smart meter. Finally, each connection is associated with a connection existence state that is a discrete-valued time series that indicates whether the connection exists at the corresponding time or not. The discrete-valued time series relating to existence state, container relationship, and connection existence state convey topology at each time point in the series. Thus, for example, if a given instance 230 is removed from the network 140, the existence state of that instance would reflect the removal. As another example, a topology change may also be reflected in a change in connection existence state. Some examples are illustrated below. Conductivity state may be regarded as conveying operational information of the network 140, which is further discussed below, rather than topological information.

Figure 3:
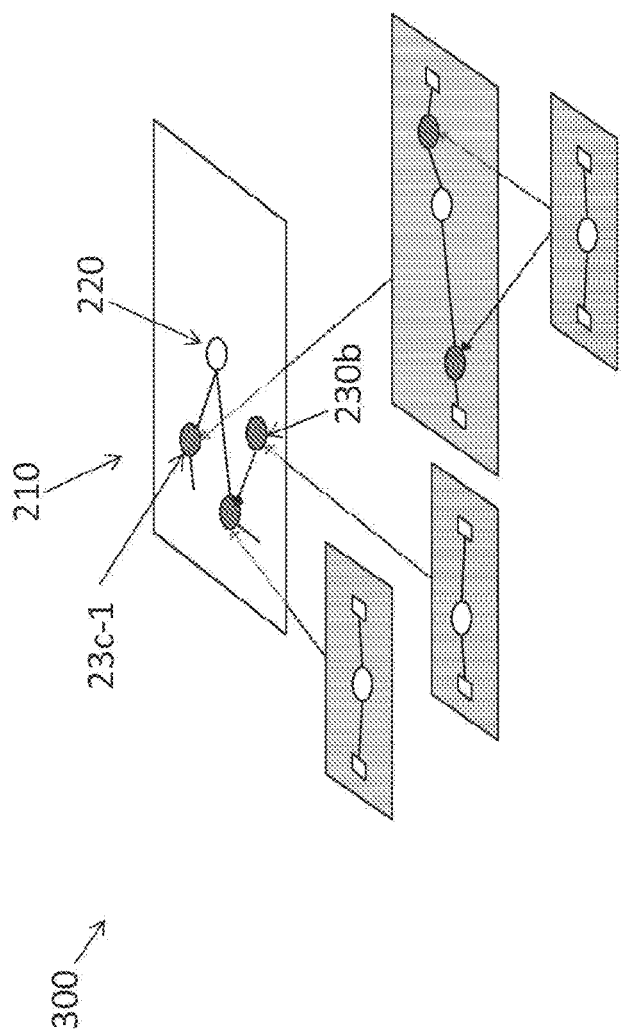
FIG. 3 shows a hierarchical graph of a circuit definition at a different time point than shown in FIG. 2.

FIG. 3 shows a hierarchical graph 300 of the definition 210 at a different time point than shown in FIG. 2. As a comparison of FIGS. 2 and 3 shows, one of the instances 230 in the definition 210 shown in FIG. 2 is not part of the definition shown in FIG. 3. This means that the existence state of the instance 230 that is not shown in FIG. 3 has changed from its existence state in FIG. 2. That is, the existence state of the instance 230 was that the instance 230 exists (at the time point shown in FIG. 2) and is now that the instance 230 does not exist (at the time point shown in FIG. 3). In addition, the connection existence state of the connection 240 between the connectivity node 220 and the instance 230 that no longer exists (at the time shown in FIG. 3) is also changed from its connection existence state at the time point shown in FIG. 2. That is, the connection existence state of the connection 240 was that the connection 240 exists (at the time point shown in FIG. 2) and is now that the connection 240 does not exist (at the time point shown in FIG. 3). As should be clear the entity existence state of instance 230 discussed with reference to FIG. 3 is linked with the connection existence state of the connection 240 discussed with reference to FIG. 3, because the connection to an entity that does not exist at a given time point cannot logically exist at that time point.

Figure 4:
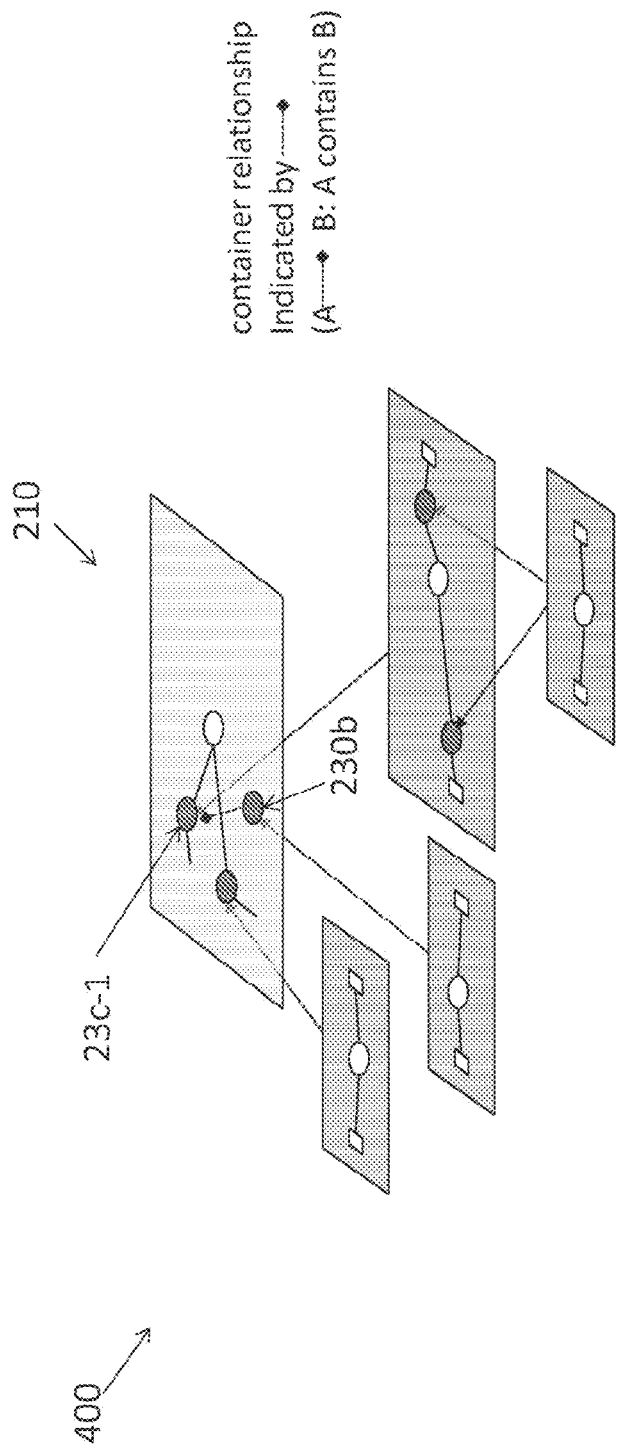
FIG. 4 shows a hierarchical graph of a circuit definition at a different time point than shown in FIGS. 2 and 3.

FIG. 4 shows a hierarchical graph 400 of the definition 210 at a different time point than shown in FIGS. 2 and 3. As a comparison of FIGS. 2, 3, and 4 indicates, the instance 230*c*-2 that had a positive existence state (does exist) at the time point shown in FIG. 2 has a negative existence state (does not exist) at the time points shown in FIG. 3 and FIG. 4. Between FIGS. 3 and 4, the change is in the container relationship between instances 230*b* and 230*c*-1. At the time point shown in FIG. 3, there is no container relationship between the instances 230*b* and 230*c*-1. However, at the time point shown in FIG. 4, there is a container relationship between instances 230*b* and 230*c*-1 indicating that instance 230*b* contains instance 230*c*-1 at the time point shown in FIG. 4. FIGS. 3 and 4 illustrate topological changes in the network 140 at different time points.

As noted above, not only topology, but operational values within the network 140 may also vary with time. These operational changes are discussed below. Again, specific nomenclature is discussed only for explanatory purposes. Time-varying quantities (e.g., voltage measurements from a voltmeter in a grid network 140) are represented by a vector-valued quantity called a time-series. The vector-valued quantity can change in value over time. Each field of the vector is a time-series field (TSField). The data schema or structure of the vector of a time-series is referred to as time-series schema (TSSchema). A many-to-one mapping between entities and time-series conforming to a TSSchema is a time-series association (TSAssoc). A one-to-one mapping between hierarchical entities and time-series conforming to a TSSchema is a hierarchical time-series association (HTSAssoc). A time-series property (TSProp) is a (key, value) pair associated with any entity or hierarchical entity. The key is a unique name for the TSProp, and the value is a single-valued time-series. A time-series property data association (TSPropData) is an association between a TSProp and a TSfield of a TSSchema. The TSPropData automatically associates the TSProp to all the entities or hierarchical entities in the TSAssoc or HTSAssoc for the TSSchma. One TSProp may be associated with any number (including 0) of (TSSchema, TSField) pairs. For a given TSSchema, there may be multiple TSAssoc or HTSAssoc to model different association scenarios. Each association element in a TSAssoc may have an existence state associated with it. In addition to the time-series related items discussed above, flow role and flow state are two other time-varying items of interest. A hierarchical entity may have a flow role associated with it. The flow role indicates that the hierarchical entity is one of a source, sink, source-sink, none, or unknown. By default, a hierarchical entity is none. For example, when the network 140 is a power grid, flow role may refer to an entity's role with respect to current flow, and when the network 140 is a gas network, flow role may refer to an entity's role with respect to gas flow. Every hierarchical connection may have a flow state associated with it. The flow state is a discrete or continuous-valued time series indicating flow direction. When the flow state is a discrete-valued time series, the values may be from the domain {"forward", "reverse", "neither", "both", "unknown"}. These values refer to the direction of flow which may alternately be represented by values from the real number domain with the sign indicating direction and magnitude indicating amount of flow, for example. As should be clear, flow states must be consistent with flow roles, conductivity states, and existence states within the network 140.

In addition to attributes associated with the hierarchical graph structure (e.g., instances, terminals, connections), additional attributes that components of the network 140 may have include the attributes of property and associative arrays. A component may have a property that includes an identifying name (e.g., serial number) and a value. Properties of a component may also represent relations such that the value may refer to another component. Properties may be used for any number of values and sparse properties or properties associated with only a subset of all components do not pose a storage penalty. Associative arrays associate attribute values with all components of a particular type and may be of two types. One type may be used to represent attributes of definitions or instances in a single-level hierarchy. In this case, every definition and instance has a unique serial number, and the associative array is an array indexed by the serial number. The second type may represent attributes of arbitrarily-nested instances using sort trees or hashing to provide efficient indexing of arrays by instance identifiers. Associative arrays and properties differ in that, while the relationship of components and property to value is one-to-one, attributes represented by associative array can be one-to-many with respect to the components. That is, by using two distinct associative arrays, it is possible to represent two distinct sets of values for a set of components. Thus, for example, multiple associative arrays may be used to represent the complex power flow of a set of electrical wire components at two different times or in different contexts. All of the time-varying information discussed above plays a role in creating a representation of the network 140. As noted above, for the system 100 to develop a representation of the network 140 at a given time or range of times, the hierarchical graph (200, 300, 400) discussed above must be combined with time-varying information about topological and operational changes within the network 140.

Figure 5:
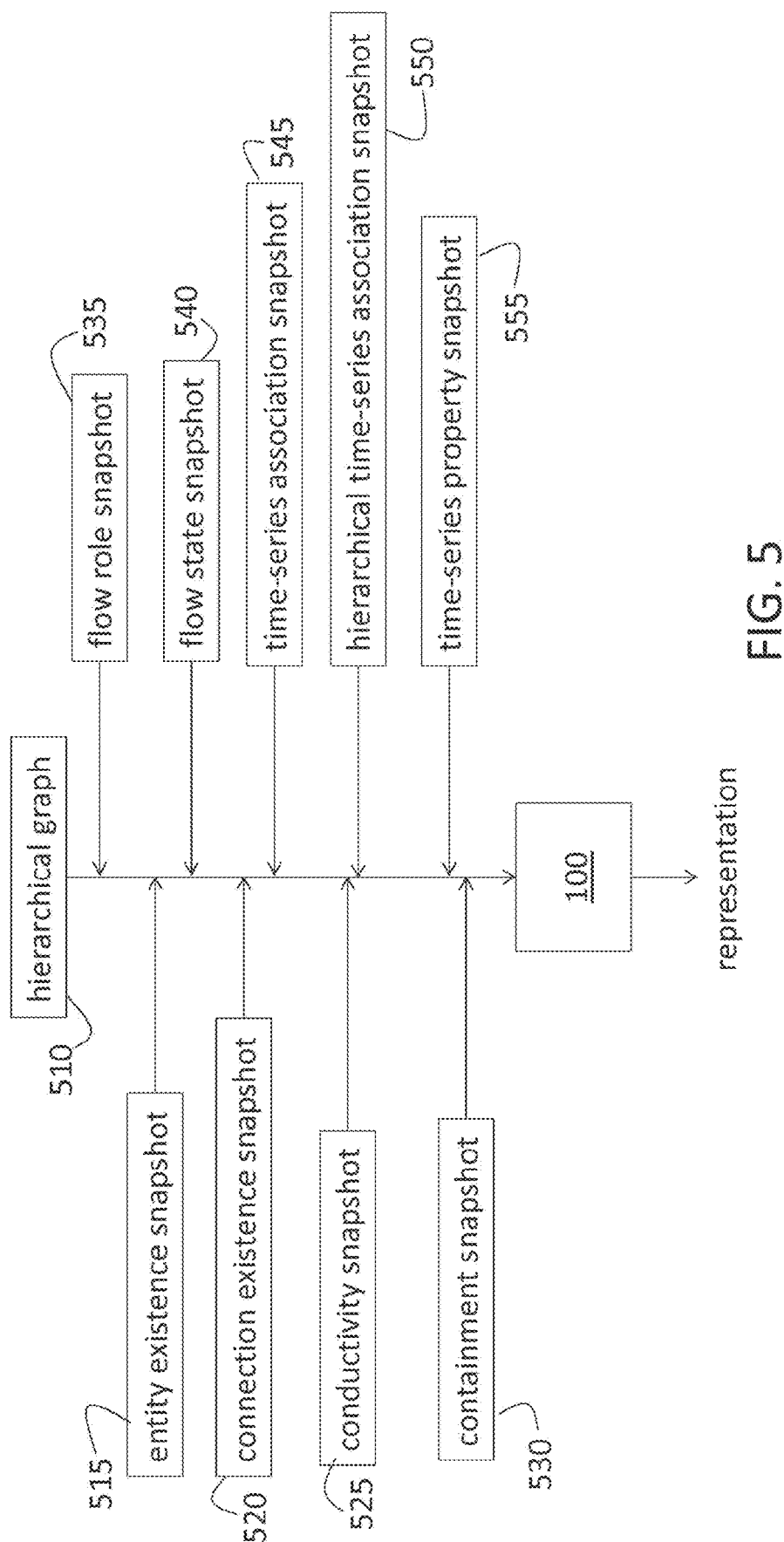
FIG. 5 is a process flow of a method of developing a representation of a network according to embodiments.

FIG. 5 is a process flow of a method of developing a representation of a network 140 according to embodiments. The method includes obtaining a hierarchical set of all the components of the network 140 (a superset), at block 510, and combining the hierarchical set with a number of snapshots to obtain the representation or hierarchical graph of the network 140 at the time of interest. The hierarchical set of all the components of the network 140 obtained at block 510 represents a hierarchical graph, and is a superset because no existence states (or any states) have been applied as yet. Obtaining the hierarchical graph may include identifying definitions 210 (repeating patterns of components such that the instance 230 serves as a shorthand for the underlying set of components of the definition 210). It is the definitions 210 that result in the hierarchy rather than a large flat set of components. In alternate embodiments, definitions 210 may be predefined by a user or a separate program. Obtaining each of the snapshots includes obtaining an entity existence snapshot at block 515, a connection existence snapshot at block 520, a conductivity snapshot at block 525, a containment snapshot at block 530, a flow role snapshot at block 535, a flow state snapshot at block 540, a time-series association snapshot at block 545, a hierarchical time-series association snapshot at block 550, and a time-series property snapshot at block 555. Each of the snapshots is obtained for a time t (which may be a single value or a range of values) and each snapshot is detailed below. A partial representation that includes a subset of these snapshots is also a valid representation.

The entity existence snapshot is a collection of existence state values for each of the entities of the network 140. As noted above in the discussion of existence state, the value for one or more entities (220, 230, 250) may be unknown. Also, the values may be explicitly specified by a user or a predefined configuration or may be interpolated from previous existence state values. The connection existence snapshot is a collection of existence state values for all connections in the network 140. Again, as noted in the discussion of connection existence state above, the value for one or more connections 240 may be unknown. Also, as discussed for the entity existence snapshot, connection existence state values may be specified by a user or by a predefined configuration or may be interpolated. The conductivity snapshot is a collection of conductivity state values for all hierarchical entities in the network 140. Again, some conductivity state values may be unknown or may be specified by a user or a predefined configuration or may be interpolated. The containment snapshot is a collection of container relationships within the network 140. The container relationships may be specified by a user or a predefined configuration or may be interpolated from time-varying container relationships.

The flow role snapshot is a collection of flow role values for all hierarchical entities in the network 140. The flow role values may be specified by a user or a predefined configuration. The flow role values may instead be interpolated from time-varying flow role of the hierarchical entities. The flow state snapshot is a collection of flow state values for all hierarchical connections in the network 140. The flow state values may be specified by a user or a predefined configuration. The flow state values may instead be computed from the existence, conductivity, and flow role snapshots at the time of interest t. The time-series association snapshot is a collection of TSAssoc values, one per TSSchema, such that there is at most one association element for any given entity or hierarchical entity under any given TSSchma. The TSAssoc association elements may be specified by a user or by a predefined configuration or may be interpolated from time-varying existence state of the TSAssoc association elements at the time of interest t. The hierarchical time-series association snapshot is a collection of HTSAssoc values, one per TSSchema, such that there is at most one association element for a given hierarchical entity under any TSSchema. The HTSAssoc association element may be specified by a user or by a predefined configuration or may be interpolated from time-varying existence state of the HTSAssoc association elements at the time of interest t. The time-series property snapshot is a collection of scalar values for some subset of the time-series properties for some subset of entities or hierarchical entities. The scalar values may be specified by a user or defined by a configuration or may be interpolated for the time of interest t from the time-series of the TSField associated with each time-series property for each entity or hierarchical entity. The TSField time-series data for a given entity or hierarchical entity is chosen based on the time-series association snapshot (obtained at block 545) that is valid at time t. The system 100 combines the hierarchical superset (obtained at block 510) with the snapshots (obtained at blocks 515 through 555) at a time t (or times) of interest to obtain the hierarchical graphical representation(s), as further discussed below.

Figure 6:
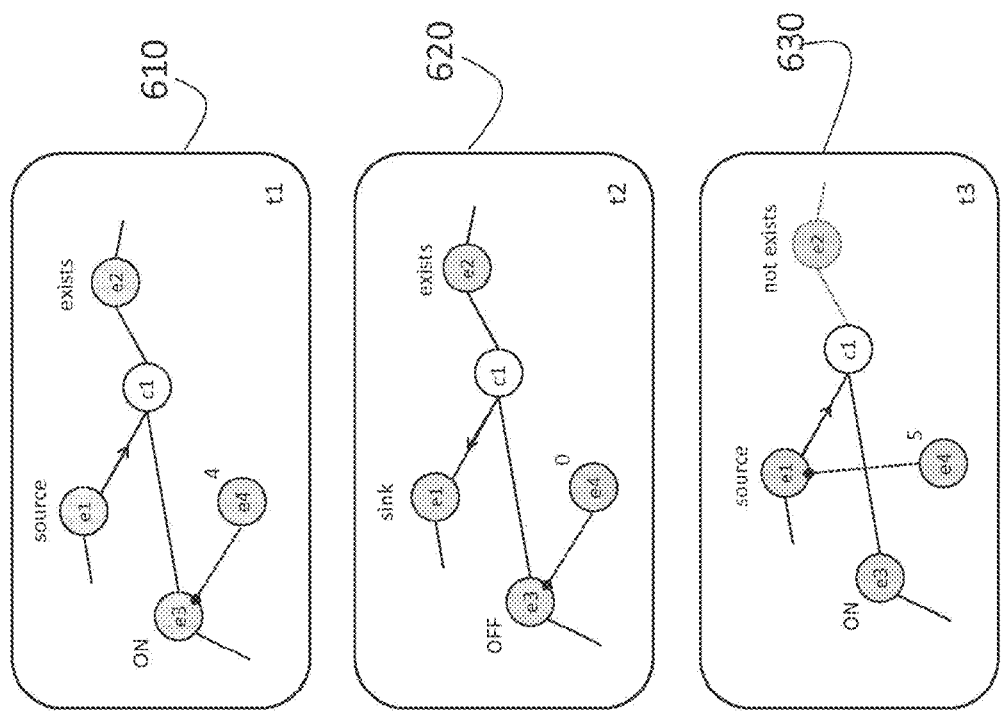
FIG. 6 illustrates exemplary representations according to embodiments.
Figure 6:
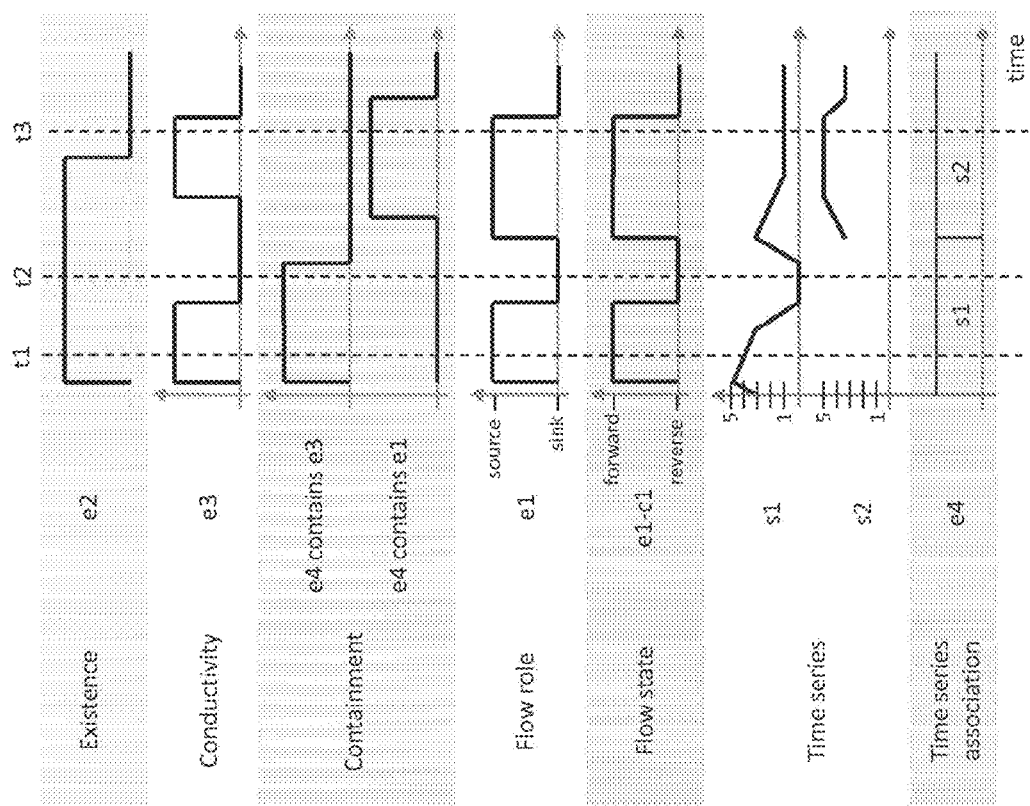

FIG. 6 illustrates exemplary representations according to embodiments detailed above. Representations 610, 620, 630 at three different time points t1, t2, and t3, respectively, are shown. Each of the representations 610, 620, 630 indicates topological information (definition 210) and operational information. As representation 610 at time t1 indicates, the existence state of entity e2, as indicated by the entity existence snapshot for entity e2 at time t1, is that entity e2 exists, and the conductivity state of entity e3, as indicated by the conductivity snapshot for entity e3 at time t1, is that entity e3 conducts. According to the containment snapshot at t1, entity e4 does contain entity e3, but entity e4 does not contain entity e1. This changes at time t3, as shown by representation 630. According to the flow role snapshot at t1, entity e1 is a source. According to the flow role snapshot at t3, as shown by representation 630, entity e1 is a source at time t3, as well, but, according to the flow role snapshot at t2, as shown by representation 620, entity e1 is a sink at time t2. The flow state snapshot from e1 to c1 follows the flow role snapshot for times t1, t2, and t3, as would be expected. That is, when entity e1 is a source, the flow state from e1 to c1 is forward, and, when entity e1 is a sink (at time t2, shown by representation 620), the flow state from e1 to c1 is reverse. The time-series property snapshot and time-series association snapshot for entity e4 must be viewed together. The time-series association snapshot indicates that entity e4 has the value associated with s1 for times t1 and t2 and has the value associated with s2 for time t2. Accordingly, the value of entity e4 is determined by s1 for time t1 (s1=4 at t1) and time t2 (s1=0 at t2) and is determined by s2 for time t3 (s2=5 at t3).

Based on the representation generated by the system 100, a number of queries and modifications can be performed on the network 140. Attribute and relation queries refer to queries (or updates) of the attribute and relation information represented by properties and associative arrays. The number of properties increases the time complexity of property queries. The number of components of an associative array either leaves the time complexity constant or affects the time complexity as a function of the log of the number of components. Traversal queries involve the entire set of components rather than a single component. The time-dependent shortest path between two points in the hierarchical graph (network 140) may be determined by a traversal that uses the existence state associative array, for example. As another example, all components "downstream" of a particular component may be determined, where "downstream" is defined by the associative array flow state. The types of queries and scenario testing facilitated by the hierarchical and multi-scenario (time-varying) graphs are not limited by any examples discussed for explanatory purposes.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing a network comprising a plurality of interconnected components, the method comprising:
    obtaining a set of all the components that are part of the network over time;
    identifying one or more repeating patterns of connectivity between two or more components among the set of all the components as corresponding lower-level definitions to generate a hierarchical set of all the components;
    obtaining time-varying information regarding changes in topology within the network, wherein a change in topology indicates a change in an arrangement of the plurality of interconnected components;
    creating a representation of the network at a set of times based on the hierarchical set of all the components and the time-varying information such that each of the one or more repeating patterns of components is represented as a corresponding single representation; and
    testing at least one scenario of the network based on the representation.

2. The method of claim 1, wherein the at least one scenario being used to determine a future configuration of the network.

3. The method of claim 2, wherein the testing determines a subset of interconnected components downstream of a particular component.

4. The method of claim 1, further comprising obtaining time varying information regarding changes in operational value indicates a change in conductivity and flow status of a component of the plurality of interconnected components.

5. The method of claim 4, further comprising, determining snapshots of a plurality of snapshots that indicate the operational values.

6. The method of claim 5, further comprising, determining the snapshots of the plurality of snapshots that indicate operational values based on developing a collection of values at the set of times indicating flow state and direction of flow at the set of times for the one or more components of the set of components.

7. The method of claim 6, wherein the snapshots of the plurality of snapshots indicate if one or more of the components are conducting electricity at any time of the set of times.

8. The method of claim 7, wherein conductivity of electricity for the one or more components of the set of components includes an indication indicating if the one or more components of the set of components is conducting electricity.

9. The method of claim 1, further comprising, answering a query about the network based on the representation at a time of interest among the set of times.

10. A non-transitory computer-readable medium including executable instructions, the executable instructions being executable by a processor to perform a method, the method comprising:
    obtaining a set of all components that are part of a network over time;
    identifying one or more repeating patterns of connectivity between two or more components among the set of all the components as corresponding lower-level definitions to generate a hierarchical set of all the components;
    obtaining time-varying information regarding changes in topology within the network, wherein a change in topology indicates a change in an arrangement of a plurality of interconnected components;
    creating a representation of the network at a set of times based on the hierarchical set of all the components and the time-varying information such that each of the one or more repeating patterns of components is represented as a corresponding single representation; and
    testing at least one scenario of the network based on the representation.

11. The non-transitory computer-readable medium of claim 10, wherein the at least one scenario being used to determine a future configuration of the network.

12. The non-transitory computer-readable medium of claim 11, wherein the testing determines a subset of interconnected components downstream of a particular component.

13. The non-transitory computer-readable medium of claim 10, further comprising obtaining time varying information regarding changes in operational value indicates a change in conductivity and flow status of a component of the plurality of interconnected components.

14. The non-transitory computer-readable medium of claim 13, further comprising determining snapshots of a plurality of snapshots that indicate the operational values.

15. The non-transitory computer-readable medium of claim 14, further comprising determining the snapshots of the plurality of snapshots that indicate operational values based on developing a collection of values at the set of times indicating flow state and direction of flow at the set of times for the one or more components of the set of components.

16. The non-transitory computer-readable medium of claim 15, wherein the snapshots of the plurality of snapshots indicate if one or more of the components are conducting electricity at any time of the set of times.

17. The non-transitory computer-readable medium of claim 16, wherein the conductivity of electricity for the one or more components of the set of components includes an indication indicating if the one or more components of the set of components is conducting electricity.

18. The non-transitory computer-readable medium of claim 17, further comprising answering a query about the network based on the representation at a time of interest among the set of times.

19. A computer program product comprising:
a non-transitory storage medium readable by a processing circuit and storing instructions for executing by the processing circuit to perform a method of managing a network that includes assets, the method comprising:
obtaining a set of all components that are part of the network over time;
identifying one or more repeating patterns of connectivity between two or more components among the set of all the components as corresponding lower-level definitions to generate a hierarchical set of all the components;
obtaining time-varying information regarding changes in topology within the network, wherein a change in topology indicates a change in an arrangement of a plurality of interconnected components;
creating a representation of the network at a set of times based on the hierarchical set of all the components and the time-varying information such that each of the one or more repeating patterns of components is represented as a corresponding single representation; and
testing at least one scenario of the network based on the representation.

* * * * *